United States Patent [19]

Miyao et al.

[11] Patent Number: 4,800,522

[45] Date of Patent: Jan. 24, 1989

[54] BILINGUAL TRANSLATION SYSTEM CAPABLE OF MEMORIZING LEARNED WORDS

[75] Inventors: Kouji Miyao, Kashihara; Hitoshi Suzuki, Nara; Hazime Asano, Kitakatsuragi; Shinji Tokunaga; Yasuhiro Takiguchi, both of Nara; Shuzo Kugimiya, Yamatokoriyama, all of Japan

[73] Assignee: Sharp Kabushiki Kaisha, Osaka, Japan

[21] Appl. No.: 862,323

[22] Filed: May 13, 1986

[30] Foreign Application Priority Data

| May 14, 1985 | [JP] | Japan | 60-103458 |
| May 14, 1985 | [JP] | Japan | 60-103459 |
| May 14, 1985 | [JP] | Japan | 60-103460 |

[51] Int. Cl.[4] .................. G06F 15/38; G06F 15/02
[52] U.S. Cl. .................................................. 364/900
[58] Field of Search ... 364/200 MS File, 900 MS File

[56] References Cited

U.S. PATENT DOCUMENTS

| 4,412,305 | 10/1983 | Yoshida | 364/900 |
| 4,475,171 | 10/1984 | Kanou | 364/900 |
| 4,499,554 | 2/1985 | Kobayashi | 364/900 |
| 4,509,137 | 4/1985 | Yoshida | 364/900 |
| 4,551,818 | 11/1985 | Sado et al. | 364/900 |
| 4,586,160 | 4/1986 | Amano et al. | 364/900 |
| 4,597,056 | 6/1986 | Washizuka | 364/900 |
| 4,608,665 | 8/1986 | Yoshida | 364/900 |
| 4,623,985 | 11/1986 | Morimoto et al. | 364/900 |
| 4,630,235 | 12/1986 | Hashimoto et al. | 364/900 |
| 4,636,977 | 1/1987 | Ikemoto et al. | 364/900 |
| 4,648,070 | 3/1987 | Washizuka | 364/900 |
| 4,703,425 | 10/1987 | Muraki | 364/900 X |
| 4,733,368 | 3/1988 | Morimoto | 364/900 |

Primary Examiner—Archie E. Williams, Jr.
Assistant Examiner—Danh Phung
Attorney, Agent, or Firm—Birch, Stewart, Kolasch & Birch

[57] ABSTRACT

An operator interactive translation system for translating sentences in a first language to sentences in a second language includes a separate memory for storing translated words in the second language as learned words corresponding to input words in the first language, upon being indicated as correct equivalents by the user. For each subsequent translation using sentence construction and morpheme analysis, the learned word stored in the buffer memory is selected as the first translation each time the specific input word in the first language appears in a sentence to be translated.

7 Claims, 9 Drawing Sheets

Fig. 5(a)

| t | h | i | s | . | | |
|---|---|---|---|---|---|---|
| i | s | | | | | |
| a | | | | | | |
| p | e | n | | | | |
| | | | | | | | buffer A

Fig. 5(b)

| | pronoun | adjective | |
|---|---|---|---|
| this --- | pronoun | adjective | |
| is --- | verb | | |
| a --- | article | | |
| pen --- | noun | | | buffer B

Fig. 5(c)

これはペンである。 — buffer E (kore wa pen de aru.)

BILINGUAL TRANSLATION SYSTEM CAPABLE OF MEMORIZING LEARNED WORDS

BACKGROUND OF THE INVENTION

1. FIELD OF THE INVENTION

The present invention relates to an automatic translation system for bilingual languages with self learning ability or self intelligence ability.

2. DESCRIPTION OF THE PRIOR ART

In general, a bilingual translation using a translation machine is performed as shown in FIG. 1, wherein the original sentence of a source language to be translated must be analyzed in various ways in the process of translation in a translation machine. These analyses can be classified into morpheme analysis (1), sentence construction analysis or syntax analysis (2) and meaning analysis (3). The morpheme analysis classifies each of the words into the person, number and sequence of the sentence by referring to grammatical information and translation information and a part of speech from a dictionary contained in a memory of the translation machine. The syntax analysis analyzes the construction of the sentence by checking the grammatical relation of each of the words. The meaning analysis determines correct analysis on the basis of a plurality of the snytax analyses. The machine translation is made by performing the morpheme analysis, syntax analysis and the meaning analysis up to a predetermined level to obtain an internal construction of the sentence of the original language and thereafter converting the inner construction of the original language into an internal construction of the translation or target language corresponding to the predetermined level at steps 4, 5 and 6, then the translation machine generates the output translation of the desired language. The accuracy of the translation in the machine depends on the degree of the predetermined level of the analysis. A translation made by using only the morpheme analysis cannot realize the translation of the sentence on a syntax basis, and the translation is limited to the word basis translation as performed in a handy type electronic translator. The translation machine performing the morpheme analysis and the syntax analysis can translate with a grammatical correctness, but generates a plurality of translation results, so that the operator must select the correct translation among them, therefore, the work of the operator increases. The translation machine performing up to the meaning analysis is theoretically able to output only one correct translation result, but there must be provided a great deal of information in the translation machine, therefore, it may be impossible to feasibly manufacture such a translation machine.

An example of translation in the conventional translation machine is explained hereinafter with reference to examples of sentences such as I write a letter And, I mail the letter.

It is assumed that the dictionary of the translation machine stores the translated words of the word "letter" "moji 文字 (a character)" first and subsequently "tegami 手紙 (a letter)" in Japanese. In this example the translation machine generates the translation of the above sentence in Japanese that 私は文字を書く (watakushi wa moji o kaku). The user may interact with the translation machine to select out a desired translation of 私は手紙を書く (watakushi wa tegami o kaku).

The conventional translation machine without self intelligence ability generates a translation of the second sentence of 私は文字を郵送する (watakushi wa moji o yuso suru) as a primary translation.

Accordingly, the operator must change the word "moji" into "tegami" again for this second sentence.

SUMMARY OF THE INVENTION

An essential object of the present invention is to provide a translation system which is able to generate a correct translation with a high degree of correctness.

Another object of the present invention is to provide a translation system which is able to generate a correct translation with a high speed.

A further object of the present invention is to provide a translation system which is able to generate a correct translation with an easy operation.

A still further object of the present invention is to provide a translation system which is able to perform translation using learned words with first priority so as to process the translation quickly.

According to the present invention, there is provided a translation system performing translation from a first language into a second language under an interaction mode between said translation system and an operator, comprising a memory for storing words of said second language translated from source words used in the source sentence of said first language, a key for selecting one of said stored words as the learned word at the time of performing the translation, a display for displaying said selected learned word and a conversion unit for converting the sentence of the first language into the sentence of the second language using said selected learned word.

BRIEF DESCRIPTION OF THE DRAWINGS

FIGS. 5(a), 5(b) and 5(c) are schematic diagrams showing the features of storing the input language parts of speech and output sentence in buffer, respectively in the translation system shown in FIG. 2, FIGS. 6(a) and 6(b) are schematic diagrams showing grammatical trees used in input sentence analysis and in translation sentence construction, respectively the translation system shown in FIG. 2

DETAILED DESCRIPTION OF THE PREFERRED EMBODIMENT

Figure 1:
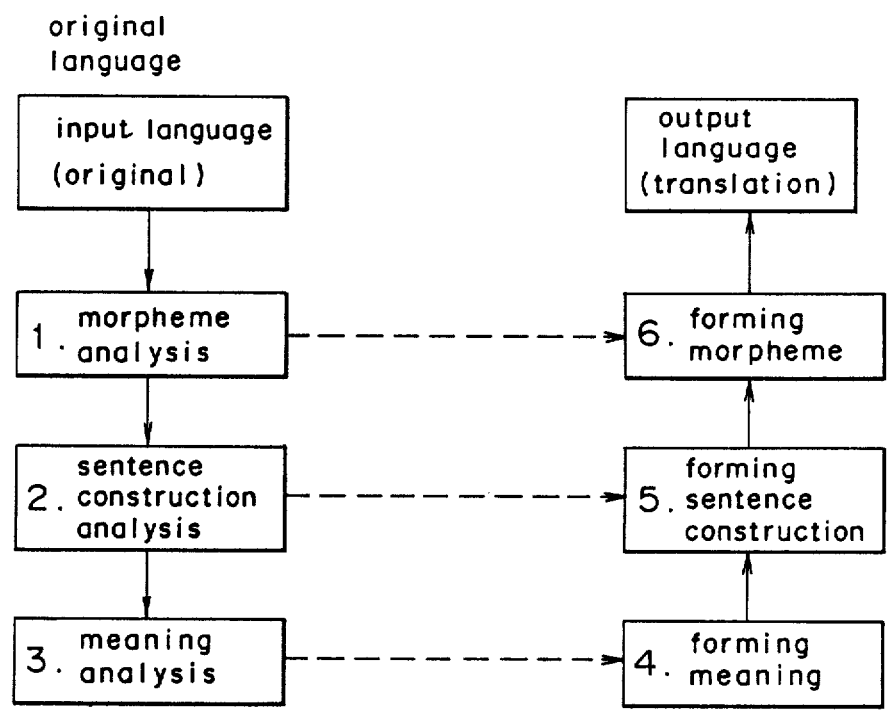
FIG. 1 is a block diagram showing a process of a bilingual translation.
Figure 2:
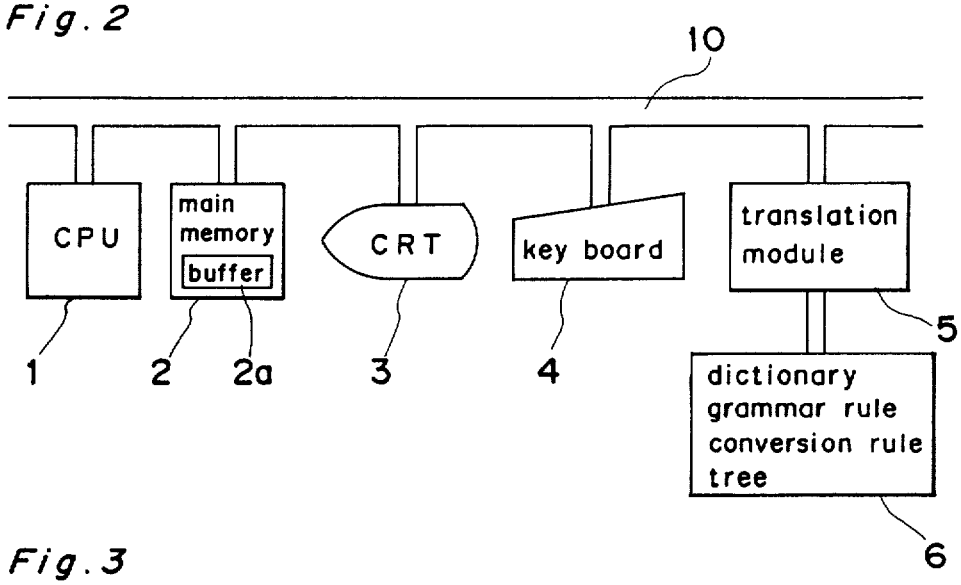
FIG. 2 is a block diagram showing an embodiment of a translation system according to the present invention.

Referring to FIG. 2, an example of a translation machine according to the present invention comprises a CPU (central processing unit) 1 including a microcomputer provided with a translation program for translating English into Japanese, a main memory 2, a display uniti 3 such as a CRT, a key board 4 for inputting various data for translation such as alphabetical character signals, numerical signals and Japanese characters. The translation machine is provided with a function of performing the translation under an interaction system between the machine and the operator. A translation module 5 is coupled to the CPU 1, main memory 2, display unit 3 and keyboard 4 through a bus 10. The translation module 5 is also coupled with an English to Japanese dictionary memory 6 storing grammatical rules of English and Japanese and tree construction conversion rules for translation of English into Japanese.

The keyboard 4 includes a start key for starting the translation machine, ten keys for inputting numerical characters of 0 to 9, character keys and various keys for performing English to Japanese translation as well as a self intelligence key. Moreover, there are provided in the keyboard a learning mode set key, and an automatic learning key (not shown).

Figure 4:
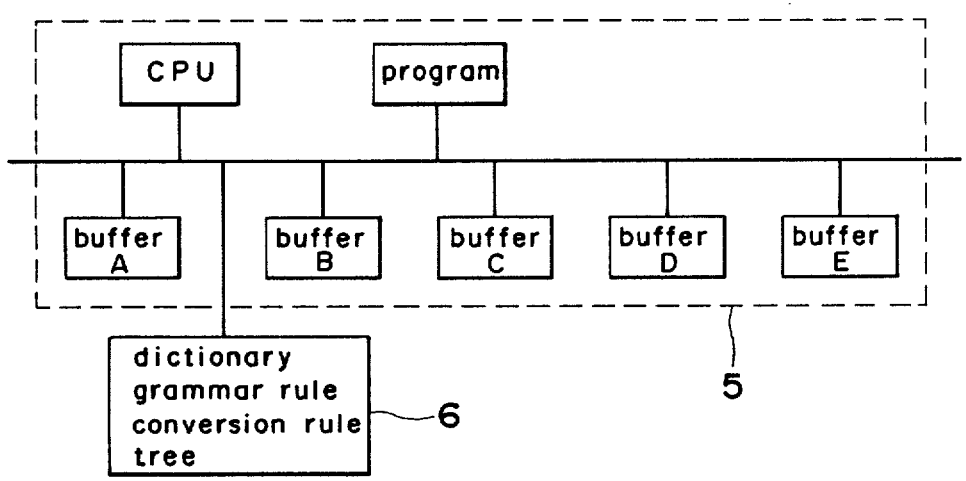
FIG. 4 is a block diagram showing a further detail of the translation module.

In the translation machine shown in FIG. 2, the source sentence of the source language inputted by the keyboard 4 is transmitted to the translation module 5 under the control of CPU 1 and the result of the translation is transmitted to the display unit 3 and displayed therein. The translation module 5 comprises a plurality of buffers A to E controlled by the CPU 1 by the program as shown in FIG. 4.

Figure 3:
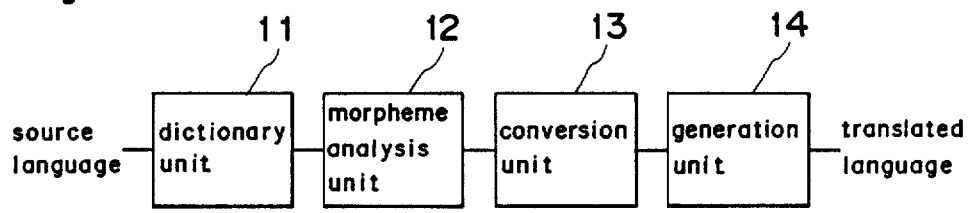
FIG. 3 is a block diagram showing an example of a translation module used in the system of FIG. 2.
Figure 6A:
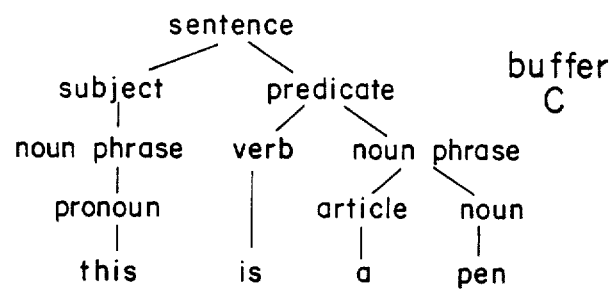

When a source English sentence "This is a pen" is inputted from the keyboard 4, the source sentence is stored in the buffer A as shown in FIG. 5(a). Necessary information is consulted in the dictionary part 11 in the translation module 5 as shown in FIG. 3, and the selected information is, stored in the buffer B. Part of speech information of each of the words of the source sentence thus drawn from the dictionary part 11 is stored in the buffer B as shown in FIG. 5(b). The word "this" is definitely selected by the morpheme analysis unit 12 and the construction relation of each of the words is stored in the buffer C as shown in FIG. 6 (a). Using the grammar rules stored in the grammer memory 6 shown in FIG. 2, the following information can be obtained:

a sentence: a subject part and a predicate part
the subject part: noun phrase
predicate part: verb and noun phrase
noun phrase: a pronoun
noun phrase: article and noun The above results show that a sentence comprises a subject part and a predicate part, for example.

Figure 6B:
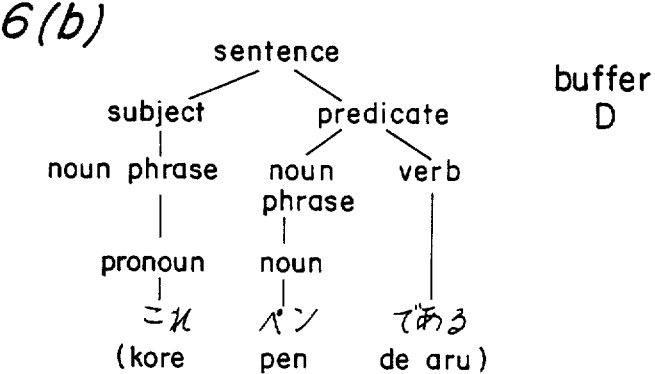

In a conversion unit 13, a syntax analysis is performed according to the sentence construction tree and stored in the buffer D as shown in FIG. 6(b). The result stored in the buffer D is modified by one or more suitable auxiliary verbs in the translation generation unit 14 so as to provide a suitable sentence translated into Japanese, which is stored in the buffer E and then the translation of the sentence in Japanese is outputted from the translation generation unit 14.

A self learning buffer 2a is provided in the main memory 2 according to the present invention.

Figure 7A:
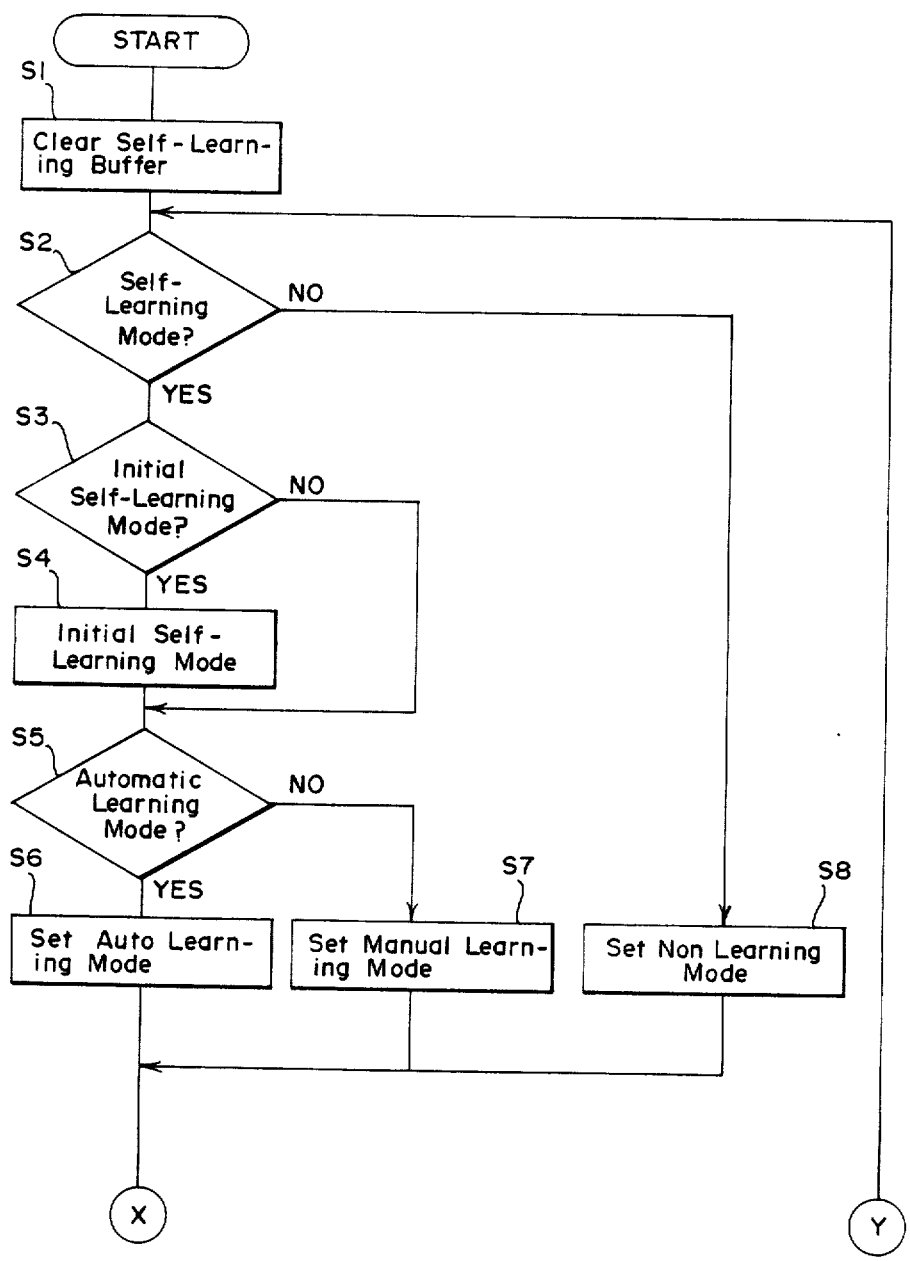
FIGS. 7(a) and 7(b) illustrate a flow chart showing an operation of an embodiment of the translation system according to the present invention.

As shown in FIG. 7(a), when the translation machine is started, the self learning buffer 2a (represented by SLB) is cleared in the step S1. The operator selects the self learning mode (represented by SLM) by the operation of the self learning key (not shown). This operation is detected in the step S2. When the self learning mode is not set, the program flow goes to the step S8 wherein non self learning mode (represented by N SLM) is set. In case the self learning mode is set, the program flow goes to the step S3 wherein it is judged whether or not an initial self learning mode (ISLM) is made. The term initial self learning mode means a mode of storing predetermined translation words in the translation machine. For example, when the translation machine learns a word "field" initially, upon input of the word "field", the Japanese words of "field" are displayed on the display unit 3 as in the TABLE 1

TABLE 1

| source word | field |
|---|---|
| Japanese | 1. nohara |
| | 2. hirogari |
| | 3. maizochi |
| | 4. senjo |
| | 5. kyogijo |
| | 6. jimen |
| | 7. bunya |
| | 8. ba |

Then the operator moves the cursor below the Japanese word of bunya, and "bunya" is stored in the main memory 2. Thus every time the word "field" appears thereafter, the Japanese word "bunya" can be selected with first priority. In case the operator wishes to delete the Japanese words already stored in the main memory, the unnecessary word may be deleted from the main memory 2 by actuating a clear key in the step S4. In the step S5 it is judged whether or not an automatic self learning mode ASLM is set. In case ASLM is set, the program flow goes to the step S 6 to select the self learning mode. If ASLM is not set, the program flow goes to the step S7 to select the manual learning mode MLM. Then in the step S9, a source sentence (SS) is inputted.

Thereafter, in the steps S10 to S13, an automatic translation is executed in the translation machine by performing consulting dictionary (CD), syntax analysis (SA), conversion (CONV) of the source sentence to the translated sentence and generation (GEN) of the translation sentence (in this case a Japanese sentence). Under the self learning mode or manual learning mode, the learned word stored in the memory 2a is used in the first priority. The the program flow goes to the step S14 to display the translated sentence (DISP). The operator judges whether or not the translation is correct seeing the display unit 3. (Referred to as "correct ?" in the step S15.) In case the translation is not correct, it is judged in the step S23 whether the syntax analysis is correct or translation of a word per se is correct (referred to as SAC or WDC). If the syntax analysis is not correct, the program flow goes to the step S 11 by the operation of a syntax analysis correction key to perform the syntax analysis again. If only the word is not correct, the program flow goes to the step S24 to select a correct word (SWDC) by selecting any one of the Japanese words displayed as shown in the TABLE 1 in the display unit 3. Thus, a correct translation can be displayed in the display unit 3 returning to the step S14. When a correct translation is obtained, the program flow goes to the step S16 to judge whether self learning mode SLM is selected. In case of SLM, it is judged in the step S17 whether or not the automatic self learning mode (ASLM) is set. In case of ASLM, the words learned (LW) in the translation process are stored in the self learning buffer 2a in the step S22. In case ASLM is not set, the program flow goes to the step S18 to judge whether or not to learn the words used in the translation process. In case learning is not desired the the program flow goes to the step S21 to judge whether there is a subsequent sentence to be translated. In case learning is desired, the program flow goes to the step S19, wherein the words to be learned are designated by the operator. Then the words designated by the operator are stored in the memory 2a in the step S20. If there are words to be cleared, such words can be cleared in the steps S25 and S26. The the program flow goes to the step S27 to judge there is an instruction of change of the learning mode (referred to as CHM). In case the learning mode is changed over, the program flow goes to the step S2. In case the learning mode is not changed over, the program flow goes to the step S9 to prepare to receive the following translation.

Figure 8:
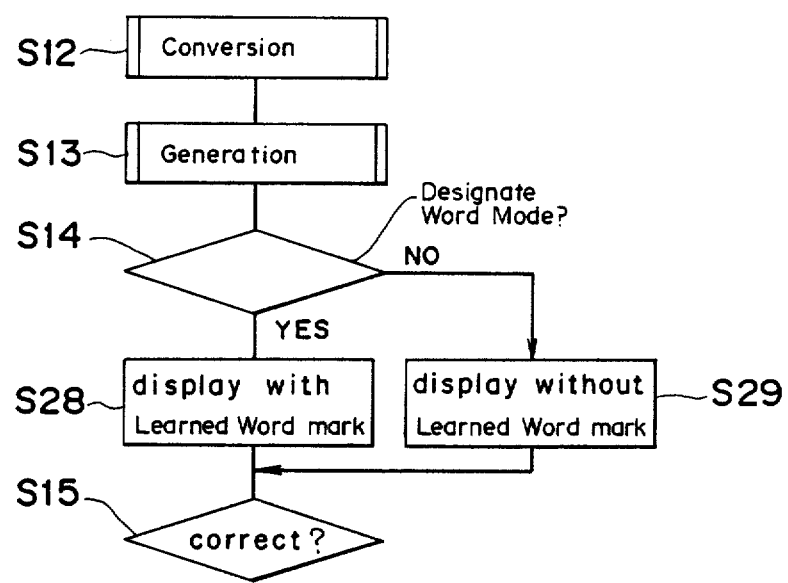
FIG. 8 is a flow chart showing a modification of the operation of the translation machine according to the present invention.

A modification of the translation machine according to the present invention is shown in FIG. 8. In the modification there is provided a function of displaying a * (asterick) mark on the word or words which are stored in the buffer by the learning operation as shown in the step S28 in FIG. 8. This mode is abbreviated as DWDM in FIG. 8. Also the term "learned word" is expressed as LWD. It is assumed that the following source English sentence is translated, I study air pollution in the field.

In this modification, if DWDM is set, the program flow goes to the step S28 wherein at the time of generation of the translated sentence, in case the translated sentence includes the learned word, * mark is displayed on the display unit 3 at the leading portion of the word in a manner as shown below.

Watakushi wa taiki osen o (* genchi) de kenkyu suru.

In place of displaying the * mark the learned word may be emphasized by an underline as follows.

Watakushi wa taiki osen o genchi de kenkyu suru.

A further modification is such that

| Watakushi wa taiki osen o | 1. nohara de kenkyu suru. |
|---|---|
| | 2. hirogari |
| | 3. maizochi |
| | 4. senjo |
| | 5. kyogijo |
| | 6. jimen |
| | 7. bunya |
| | 8. genchi |
| | 9. ba |

In the above modification, the learned word is the eighth Japanese word genchi.

In case DWDM is not set, the translated sentence is displayed without any mark in the step S29.

In judging whether or not the words are already learned, the CPU accesses the learning buffer 2a. In case the word "genchi" of the source word "field" was already learned in the past, the word "genchi" is stored in the learning buffer 2a with the number 8 and "genchi" as a pair. Thus it can be judged that the word "genchi" is the learned word.

Figure 7B:
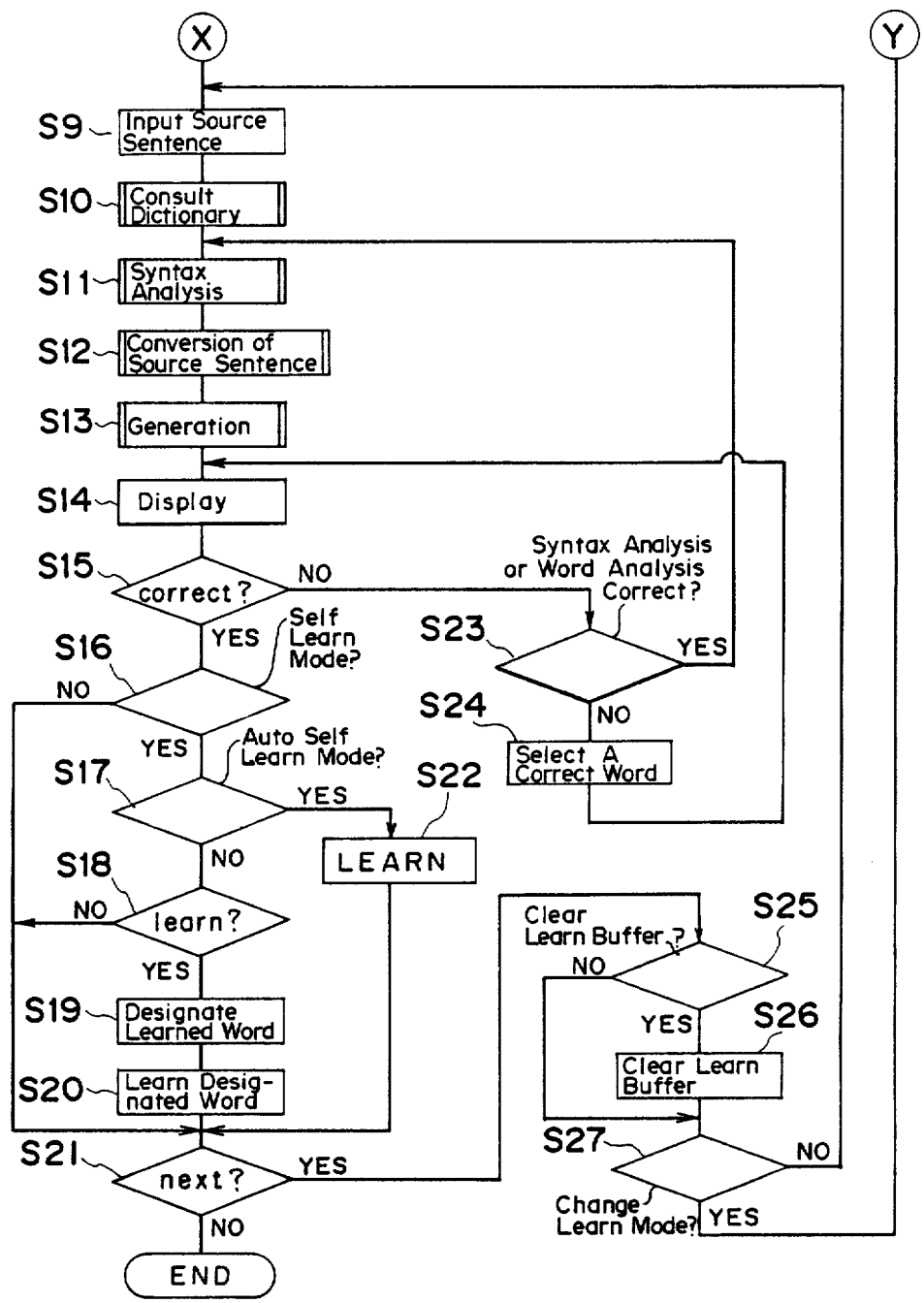
Figure 9:
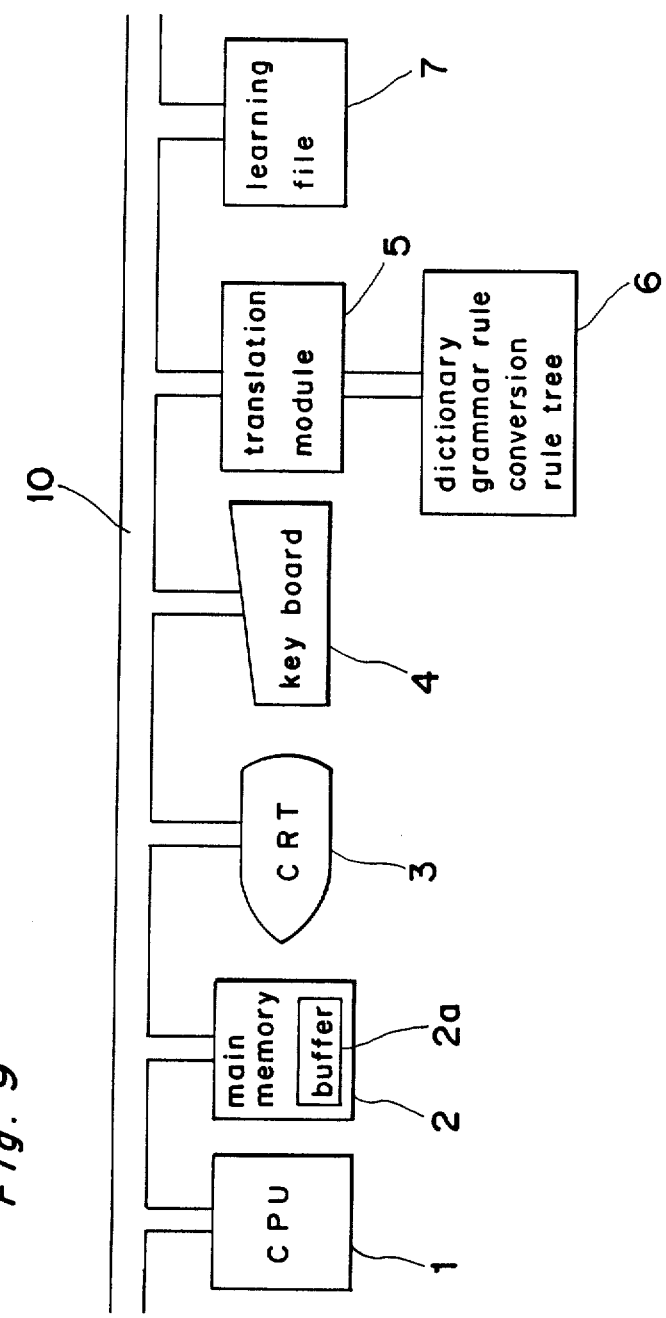
FIG. 9 is a block diagram showing another embodiment of the translation system according to the present invention.
Figure 10:
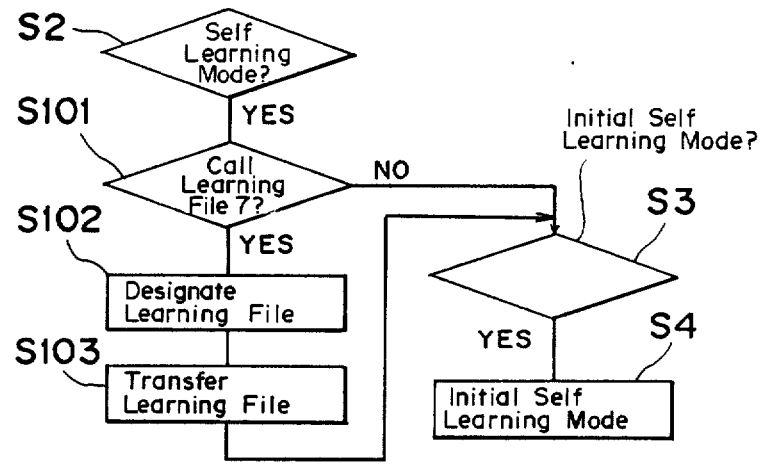
FIGS. 10(a) and 10(b) are flow charts showing essential portions of the operation of the translation system shown in FIG. 9.
Figure 10:
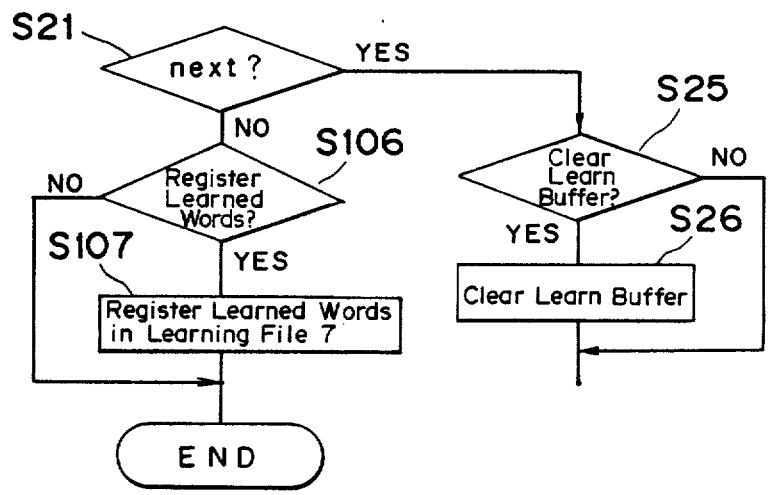

Referring to FIGS. 9, 10(a) and 10(b) showing another embodiment of the translation machine according to the present invention, there is provided an external memory 7 using a RAM for storing the learned words in the form of a file named learning file. Such learning file may comprise a plurality of files for storing the learned words for every field, for examples, the words for mechanical engineering, chemical engineering and so on. In this embodiment, there are provided additional steps S101 to S103 between the steps S2 and S3 shown in the flow chart of FIG. 10(a). In the step S101, it is judged whether or not the learning file 7 is called (referred to as "call L F 7" in FIG. 10(a)). This calling may be set by a specific key in the keyboard. When calling the learning file 7 is set, the program flow goes to the step S102 (shown as DLF) to designate the learning file 7. The the program flow goes to the step S103 (shown as TLF) to transfer the contents of the learning file 7 in the learning buffer 2a. Then the program flow goes to the step S3 and the translation operation mentioned with reference to FIG. 7 is executed. In case the calling of the learning file 7 is not designated, the the program flow goes to the step S3 directly.

After the step S21, there are provided additional steps S106 and S107. In the step S106 (shown as RLW) it is judged whether or not there is an instruction of registering the learned words which are newly taught in the translation work into the learning file 7. In case the registration in the learning file 7 is indicated, the program flow goes to the step S107 (shown as "RLW in LF 7") to register the new learned words in the learning file 7 using the data stored in the learning buffer 2a. In case the registration is not designated, the program flow goes to the END directly.

By the arrangement shown in this embodiment, since the words already learned are saved in the learning file 7, these words can be used in every translation work. This means that in case the sentence to be translated is similar to the sentence already translated in the past, the present translation work can be performed using the learned words stored in the file 7 from the beginning of the present translation work, thereby enabling the translation work to proceed rapidly. Also, the learned words may be stored in separate files for every field of technology.

Also since the learned words are saved in the learning file 7, the same translated words can be used throughout the translation work.

What is claimed is:

1. A translation system for translating sentences in a first language to sentences in a second language, comprising:

storage means for storing individual words in said first language together with a plurality of words in said second language, each word of said individual words being equivalent to a number of words in said plurality of words stored with said individual words;

means for storing an input sentence in said first language to be translated;

means for determining the part of speech of each individual word in said stored input sentence;

means for selecting a first one of said plurality of words in said second language stored with an individual word as corresponding to said individual word based on the part of speech determination;

means for selecting another one of said plurality of words as corresponding to said individual word in response to a signal from a user indicating the previous selected word to be incorrect;

means for storing a selected word in said second language as a learned word corresponding to an individual word in said first language in response to a signal from a user indicating the correspondence to be correct; and means for selecting the learned word as said first one of said plurality of words in subsequent translations of input sentences containing said individual word.

2. The translation system defined in claim 1, further comprising display means for displaying sentences in said first and second languages including means for displaying learned words with specified marks identifying said learned words.

3. The translation system according to claim 2, wherein said specific mark is an asterisk mark attached to the learned word.

4. The translation system according to claim 2, wherein said specific mark is an underline represented to emphasize the learned word.

5. The translation system according to claim 2, wherein a translated sentence is displayed on the display means and said mark is attached to the learned word contained in the displayed sentence.

6. The translation system according to claim 2, wherein said means for storing the learned word is a buffer which is cleared upon each start-up of said translation system.

7. The translation system according to claim 2, wherein said means for storing the learned word is an external memory means which can save learned words for subsequent start-ups of said translation system.

* * * * *